United States Patent [19]
Cox

[11] 3,988,927
[45] Nov. 2, 1976

[54] COMMAND BAR MECHANISM FOR FLIGHT DIRECTOR INDICATOR

[75] Inventor: Ronald E. Cox, Margate, Fla.

[73] Assignee: The Bendix Corporation, Southfield, Mich.

[22] Filed: Sept. 2, 1975

[21] Appl. No.: 609,636

[52] U.S. Cl. .................... 73/178 R; 116/DIG. 43
[51] Int. Cl.² ........................................ G01C 21/00
[58] Field of Search .......... 73/178 R, 178 T, 178 H; 116/DIG. 43

[56] References Cited
UNITED STATES PATENTS

| | | | |
|---|---|---|---|
| 2,613,050 | 10/1952 | Esval | 73/178 R |
| 2,696,597 | 12/1954 | Chombard | 73/178 R |
| 3,162,834 | 12/1964 | Schweighoffer et al. | 73/178 R |
| 3,691,987 | 9/1972 | Strock | 73/178 R |

Primary Examiner—Donald O. Woodiel
Attorney, Agent, or Firm—W. G. Christoforo; Bruce L. Lamb

[57] ABSTRACT

A command driving mechanism for command bars which are rotatable about the longitudinal axis of and transversely displaceable with respect to the horizontal reference line of a flight director indicator includes a command plate, the plane of which is parallel to the front face of the indicator. The perpendicular axis of the command plate is coaxial with the longitudinal axis of the indicator and rotatable thereon in accordance with roll commands. Command bar struts are pivotally supported at diametrically opposed peripheral portions of the command plate and connected through a wire bail which is driven by a helical cam in accordance with pitch commands.

3 Claims, 3 Drawing Figures 3,988,927

COMMAND BAR MECHANISM FOR FLIGHT DIRECTOR INDICATOR

BACKGROUND OF THE INVENTION

This invention relates to aircraft flight director indicators and more particularly to simplified mechanisms for driving the command bars thereof.

Flight director indicators are used aboard aircraft to display to the pilot a unified presentation of the aircraft location and attitude in its spatial field of interest and to further indicate to the pilot the aircraft maneuvers required to reposition the aircraft to a desired attitude and displacement within the aforementioned field of interest. To accomplish this, the indicator, which is normally a panel mounted instrument, includes a front face having disposed essentially therein a shaped representation of the aircraft which is fixed with respect to the aircraft. Also located in the front face is an artificial horizon display maintained aligned with the actual horizon by a gyro as the aircraft maneuvers. The artificial horizon is additionally aligned with the indicator in such a manner that when the aircraft is straight and level the aircraft representation or fixed reference is parallel with respect to and aligned on the artificial horizon.

Command bars supported on the ends of struts which extend around the artificial horizon are driven by pitch and attitude command signals from the flight computer to present a realistic composite command display to the pilot when the command bars are viewed with respect to the fixed reference. The pilot obeys the command presented on his indicator by flying the fixed reference onto the command bars.

It is, of course, important in the aircraft instrument art that such instruments be as compact and simple as possible, while being suitable to perform their required functions. It is, thus, the main object of this invention to provide a simple, compact driving mechanism for the command bars of a flight director indicator. This is accomplished through the use of a command plate disposed behind the flight director indicator artificial horizon mechanism and having perpendicular axis which generally coincides with the flight director indicator longitudinal axis and about which the command plate is rotatably driven in accordance with roll commands. A pair of command bar struts are pivotally attached at diametrically opposed peripheral positions on the command plate and extend generally perpendicularly therefrom along the sides of the artificial horizon mechanism to terminate at their free ends in the command bars which are turned inward across the artificial horizon display so that in response to a zero command the command bars are aligned in close proximity with the fixed reference. The pivoted ends of the command bar struts are connected through a bail which is driven by a cam to position the command bar struts and hence the command bars in accordance with pitch command.

DESCRIPTION OF THE PREFERRED EMBODIMENT

Figure 1:
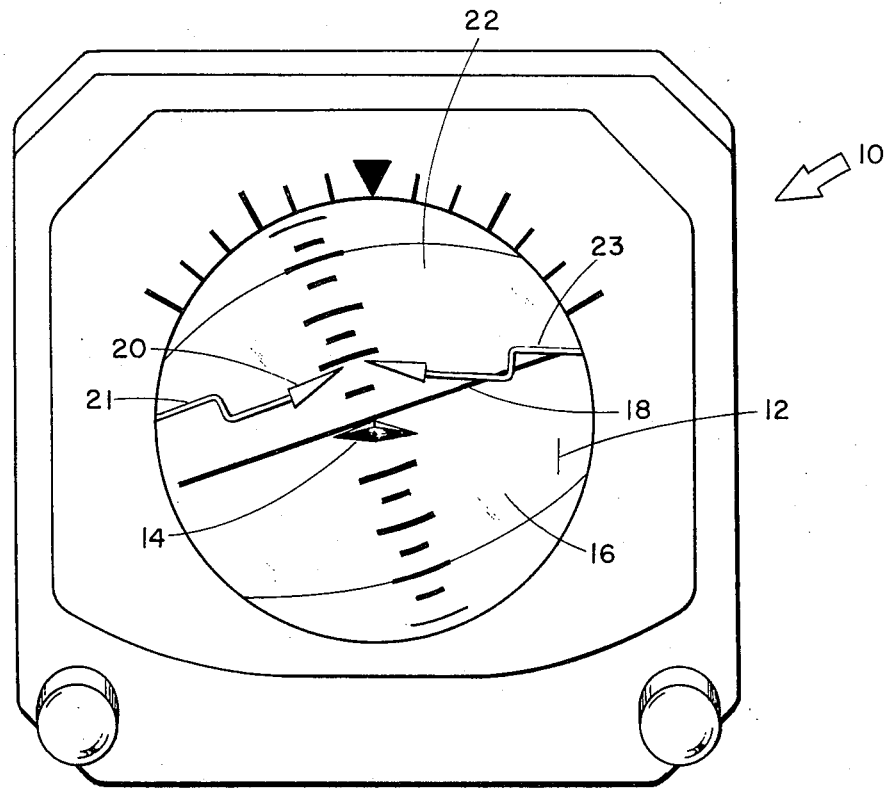
FIG. 1 is a pilot's view of the front face of a typical flight director indicator.

Referring to FIG. 1 a typical flight director indicator 10 as seen by the pilot includes a transparent front 12 to which is centrally and fixedly attached a representation 14 of the aircraft. Representation 14 may be at the option of the system designer either an essentially two dimensional shape affixed to transparent front 12 or a three dimensional shape extending along the longitudinal axis of indicator 10 in the direction of an artificial horizon display 16. Horizon display 16, as known to those skilled in the art, can be presented on a flat card or generally on the external surface of a spheroid shaped object. In any event, the horizon display includes a horizon line 18 which is maintained aligned with the true horizon by a gyro (not shown). Thus, since reference 14 is fixed with respect to the aircraft and horizon 18 is fixed with respect to the true horizon the intercooperation between reference 14 and horizon line 18 provides an indication of the true attitude of the aircraft. The display of FIG. 1 shows the aircraft is at a zero pitch angle but rolled to the right.

The flight director indicator also includes command bars 20 and 22 connected respectively to command bar struts 21 and 23 extending from on either side of the horizon display 16. The command bar struts and hence the command bars are driven by a mechanism to be described below in accordance with aircraft maneuvering commands generated by a command logic system. In order to obey the maneuvering command presented by the command bars, the pilot flys reference 14 and hence the aircraft onto the command bars. In order to obey the maneuvering command illustrated in FIG. 1 the pilot must bring the nose of the aircraft up.

Figure 2:
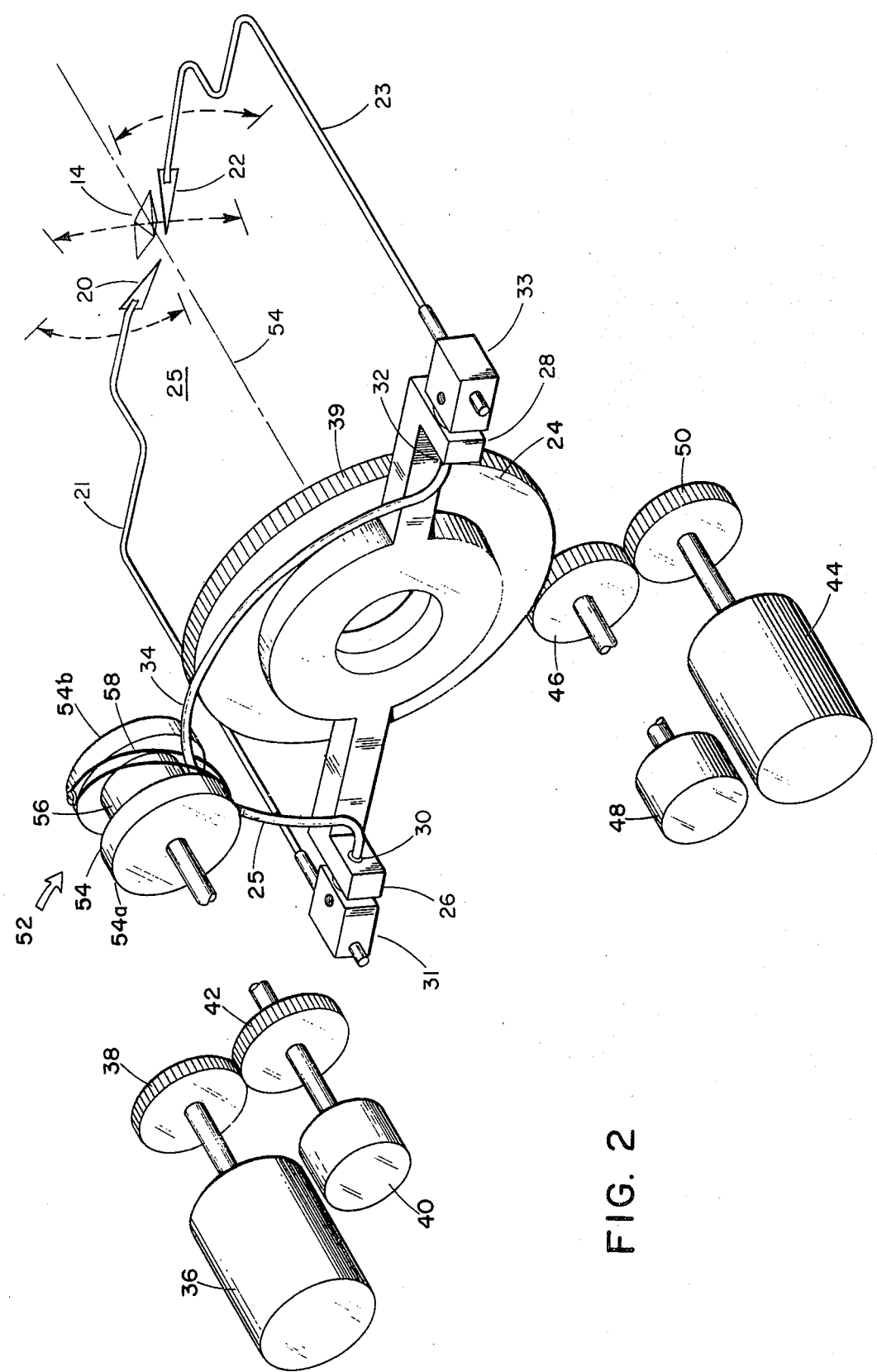
FIG. 2 is a perspective exploded schematic view of a preferred embodiment of the invention.

Refer now to FIG. 2 which shows a perspective exploded schematic view of a preferred embodiment of the invention which comprises the mechanism for driving the command bars 20 and 22 and command bar struts 21 and 23, previously seen in FIG. 1. An artificial horizon mechanism which includes a horizon display such as display 16 of FIG. 1 and a controlling gyro as previously mentioned is normally positioned between the command bar struts in space 25, but has been left out of this figure for clarity in explaining the operation of the invention. Other elements in the flight director indicator have also been omitted for clarity.

Command bar struts 21 and 23 terminate at their ends opposite the command bars in command bar strut blocks 31 and 33, respectively, which in turn have fixed thereto generally perpendicular to the command bar struts pitch command shafts 30 and 32 which are turned in and pivotally attached to pitch pivots 26 and 28, respectively. A bail 34 suitably of metallic wire connects the pitch command shafts 30 and 32. A plane through bail 34 is generally perpendicular to a plane through struts 21 and 23. Command bars 20, 22, command bar struts 21, 23, command bar strut blocks 31, 33 and bail 34 comprise a single unitary structure which is supported by and pivots in pitch pivots 26 and 28. Pitch pivots 26 and 28 are attached to and carried at diametrically opposed points with respect to a round command plate 24.

The perpendicular axis of command plate 24 generally coincides with the longitudinal axis 54 of the flight director indicator and is supported by means (not shown) which permits the command plate to rotate thereon. This motion is affected by a command plate gear 39 which in this embodiment comprises the periphery of command plate 24. Command plate gear 39 is driven through a roll command feedback gear 46, attached to the shaft of a roll command potentiometer 48, by a roll command gear 50 attached to the shaft of a roll command motor 44. Potentiometer 48 provides electrical feedback for the command logic system, as will be explained below. It can be seen that the roll command motor 44 operating in response to a roll command from the flight director computer and acting through the roll command gear, roll command feedback gear and command plate gear will rotate the command plate on the flight director indicator longitudinal axis, carrying with it the command bar struts and command bars to provide a display of roll commands which is interpreted by observing location of the command bars with respect to the fixed reference.

A pitch command motor 36 has its rotor shaft fixedly attached to pitch command gear 38. A pitch command feedback gear 42, which meshes with and is driven by pitch command gear 38, is attached to the shaft of pitch command feedback potentiometer 40 to provide pitch command feedback electrical signals to the command logic system as will be described below. Also attached to the same shaft with feedback gear 42 is pitch command actuator 52 which is thus driven by pitch command motor 36. The pitch command actuator preferably comprises a spindle-shaped body 54 having a reduced cylindrical body 56 between larger cylinders 54a and 54b. A helical cam surface 58, which in this embodiment is made of parallel metallic wires connected between cylinders 54a and 54b, is adapted to receive bail 34. It can be seen that as pitch command actuator 52 is rotated on its axis with gear 42, bail 34 will be pivoted in pitch pivots 26 and 28 about pitch command shafts 30 and 32. This, of course, will cause the command bar to be displaced in a generally vertical direction with respect to the fixed reference to display a pitch command. It can be seen that a composite command comprised of pitch and roll commands such as that illustrated in FIG. 1, can be displayed by applying roll command signals to motor 44 and simultaneous pitch command signals to motor 36.

Figure 3:
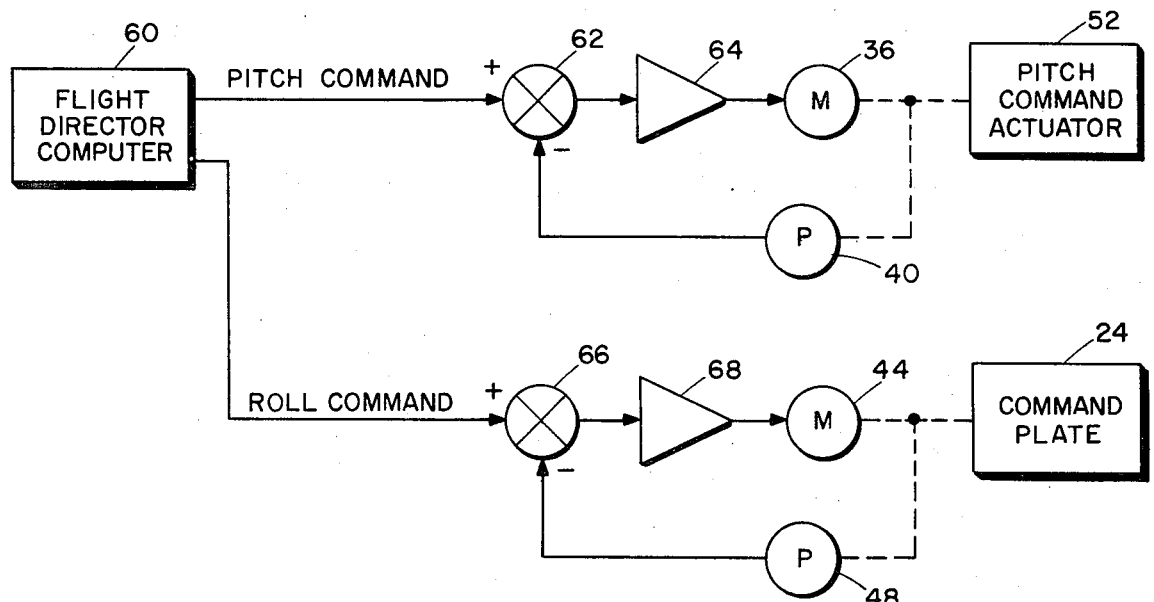
FIG. 3 is a block diagram of a command logic system suitable for use in the invention.

The command logic system for driving the mechanism of FIG. 2 is seen at FIG. 3, reference to which should now be made. The command logic system comprises a flight director computer 60 which generates, from inputs known to those skilled in the art, pitch and roll commands. The pitch command signal, for example, is applied to a mixer 62 which also receives the feedback signal from pitch command feedback potentiometer 40. The output signal from mixer 62 is amplified by driver 64 to control motor 36 which positions the pitch command actuator 52. Elements 36, 40 and 52 have been previously seen in FIG. 2. The roll command signal is applied to mixer 66 which also receives a signal from the roll command feedback potentiometer 48. The output signal from mixer 66 is amplified by driver 68 and applied to motor 44 which drives command plate 24.

Although only one embodiment of the invention has been illustrated and described, certain alterations and modifications will readily suggest themselves to one skilled in the art. For example, command plate 24 of FIG. 2 might optionally be driven by roll command motor 44 through a crank or other suitable linkage rather than through the gears as illustrated. Accordingly, the invention is to be limited only by the true spirit and scope of the appended claims.

The invention claimed is:
1. In a steering command indicator having a longitudinal axia and a front face perpendicular thereto and including an indicating command member lying in and defining a line positionable in said front face in accordance with first and second command signals, means for positioning said indicating command member such that the line defined thereby is rotatable about said longitudinal axis and translatable transversely of said longitudinal axis comprising:
 a command plate having a perpendicular axis coincident with said longitudinal axis and rotatable thereon and including at least a first pivot having a first pivot axis which lies in a plane perpendicular to said longitudinal axis;
 command member carrying means comprising at least a first strut, said strut being perpendicular to said pivot axis and pivotable thereon, said strut having a position within its pivot range wherein it is parallel to said longitudinal axis, said carrying means additionally comprising a bail generally parallel to said front face, said strut extending to said front face, said command member being affixed to the end of said strut at said front face;
 a helical cam cooperating with said bail;
 a motor responsive to said first command signal to activate said helical cam to pivot said strut on said pivot axis to thereby effect translation of said line transversely of said longitudinal axis; and,
 means for rotating said command plate on its perpendicular axis in accordance with said second command signal to thereby effect rotation of said line about said longitudinal axis.

2. The device of claim 1 wherein said command plate includes a second pivot having a pivot axis which coincides with said first pivot axis and wherein said command member carrying means comprises a second strut parallel to and displaced from said first strut and rigidly connected to said first strut through said bail, said second strut being pivotable on said pivot axis and wherein said steering command indicator includes an artifical horizon means disposed between said struts, said command member carrying means being generally in a U-shape, the struts forming the legs of said U-shape, said command member being connected across the open end of said U-shape.

3. The device of claim 1 wherein said first and second command signals comprise first and second electrical signals.

* * * * *